US008347633B2

(12) United States Patent
Smith et al.

(10) Patent No.: US 8,347,633 B2
(45) Date of Patent: Jan. 8, 2013

(54) GAS TURBINE ENGINE WITH VARIABLE GEOMETRY FAN EXIT GUIDE VANE SYSTEM

(75) Inventors: Peter G. Smith, Wallingford, CT (US); Stuart S. Ochs, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 1602 days.

(21) Appl. No.: 11/829,213

(22) Filed: Jul. 27, 2007

(65) Prior Publication Data

US 2009/0097967 A1 Apr. 16, 2009

(51) Int. Cl.
*F02C 7/045* (2006.01)

(52) U.S. Cl. ..................................... 60/771; 239/265.39

(58) Field of Classification Search .................... 60/770, 60/771; 239/265.39

See application file for complete search history.

(56) References Cited

U.S. PATENT DOCUMENTS

| | | | | |
|---|---|---|---|---|
| 3,948,346 | A | 4/1976 | Schindler | |
| 3,991,849 | A | 11/1976 | Green et al. | |
| 4,235,303 | A | 11/1980 | Dhoore et al. | |
| 4,292,802 | A | 10/1981 | Snow | |
| 4,461,145 | A * | 7/1984 | Stephens | 60/226.3 |
| 4,652,208 | A * | 3/1987 | Tameo | 415/162 |
| 4,710,097 | A | 12/1987 | Tinti | |
| 5,074,752 | A | 12/1991 | Murphy et al. | |
| 5,160,248 | A | 11/1992 | Clarke | |
| 5,169,288 | A * | 12/1992 | Gliebe et al. | 415/119 |
| 5,259,724 | A | 11/1993 | Liston et al. | |
| 5,315,821 | A | 5/1994 | Dunbar et al. | |
| 5,543,198 | A | 8/1996 | Wilson | |
| 5,706,651 | A | 1/1998 | Lillibridge et al. | |
| 5,768,884 | A | 6/1998 | Hines | |
| 5,778,659 | A * | 7/1998 | Duesler et al. | 60/226.1 |
| 5,791,138 | A | 8/1998 | Lillibridge et al. | |
| 5,832,714 | A | 11/1998 | Hines | |
| 5,867,980 | A * | 2/1999 | Bartos | 60/226.3 |
| 5,943,856 | A | 8/1999 | Lillibridge et al. | |
| 6,371,725 | B1 | 4/2002 | Mantiega et al. | |
| 6,409,469 | B1 * | 6/2002 | Tse | 415/119 |
| 6,764,276 | B2 | 7/2004 | Mulcaire et al. | |
| 6,983,588 | B2 | 1/2006 | Lair | |
| 7,118,331 | B2 * | 10/2006 | Shahpar | 415/195 |
| 2004/0258520 | A1 | 12/2004 | Parry | |
| 2007/0274823 | A1 | 11/2007 | Borchers et al. | |

FOREIGN PATENT DOCUMENTS

EP 0103260 3/1984

(Continued)

OTHER PUBLICATIONS

Extended European Search Report dated Nov. 3, 2011. EP App. No. 08252509.8-2321/2022949.

*Primary Examiner* — Ehud Gartenberg
*Assistant Examiner* — Vikansha Dwivedi
(74) *Attorney, Agent, or Firm* — Carlson, Gaskey & Olds, P.C.

(57) ABSTRACT

A turbofan engine includes a variable geometry fan exit guide vane (FEGV) system having a multiple of circumferentially spaced radially extending fan exit guide vanes. Rotation of the fan exit guide vanes between a nominal position and a rotated position selectively changes a fan bypass flow path to permit efficient operation at various flight conditions.

26 Claims, 5 Drawing Sheets

FOREIGN PATENT DOCUMENTS

| | | |
|---|---|---|
| EP | 0900920 | 3/1999 |
| GB | 1522558 | 8/1976 |
| GB | 2054058 | 2/1981 |
| JP | 2000345997 | 12/2000 |
| JP | 2003172206 | 6/2003 |
| WO | 2005056984 | 6/2005 |

* cited by examiner

GAS TURBINE ENGINE WITH VARIABLE GEOMETRY FAN EXIT GUIDE VANE SYSTEM

BACKGROUND OF THE INVENTION

The present invention relates to a gas turbine engine, and more particularly to a turbofan engine having a variable geometry fan exit guide vane (FEGV) system to change a fan bypass flow path area thereof.

Conventional gas turbine engines generally include a fan section and a core section with the fan section having a larger diameter than that of the core section. The fan section and the core section are disposed about a longitudinal axis and are enclosed within an engine nacelle assembly. Combustion gases are discharged from the core section through a core exhaust nozzle while an annular fan bypass flow, disposed radially outward of the primary core exhaust path, is discharged along a fan bypass flow path and through an annular fan exhaust nozzle. A majority of thrust is produced by the bypass flow while the remainder is provided from the combustion gases.

The fan bypass flow path is a compromise suitable for take-off and landing conditions as well as for cruise conditions. A minimum area along the fan bypass flow path determines the maximum mass flow of air. During engine-out conditions, insufficient flow area along the bypass flow path may result in significant flow spillage and associated drag. The fan nacelle diameter is typically sized to minimize drag during these engine-out conditions which results in a fan nacelle diameter that is larger than necessary at normal cruise conditions with less than optimal drag during portions of an aircraft mission.

Accordingly, it is desirable to provide a gas turbine engine with a variable fan bypass flow path to facilitate optimized engine operation over a range of flight conditions with respect to performance and other operational parameters.

SUMMARY OF THE INVENTION

A turbofan engine according to the present invention includes a variable geometry fan exit guide vane (FEGV) system having a multiple of circumferentially spaced radially extending fan exit guide vanes. Rotation of the fan exit guide vanes between a nominal position and a rotated position selectively changes the fan bypass flow path to permit efficient operation at predefined flight conditions. By closing the FEGV system to decrease fan bypass flow, engine thrust is significantly spoiled to thereby minimize thrust reverser requirements and further decrease engine weight and packaging requirements.

The present invention therefore provides a gas turbine engine with a variable bypass flow path to facilitate optimized engine operation over a range of flight conditions with respect to performance and other operational parameters.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4A is a sectional view of another embodiment of a single FEGV slatted airfoil with a;

DETAILED DESCRIPTION OF THE DISCLOSED EMBODIMENT

Figure 1A:
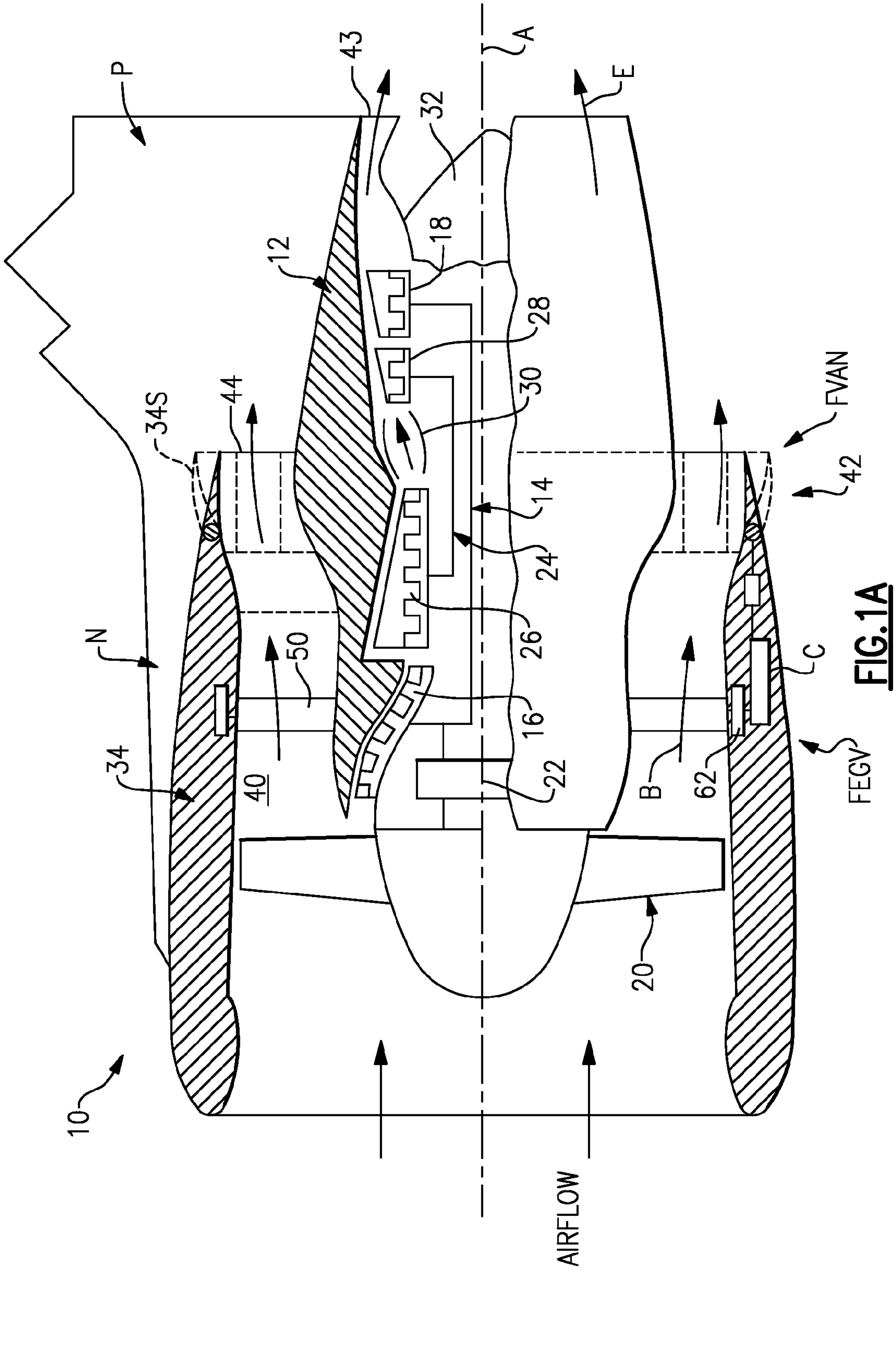
FIG. 1A is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core section within a core nacelle 12 that houses a low spool 14 and high spool 24. The low spool 14 includes a low pressure compressor 16 and low pressure turbine 18. The low spool 14 drives a fan section 20 directly or through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in the disclosed embodiment is a high-bypass geared turbofan aircraft engine in which the engine 10 bypass ratio is greater than ten (10), the turbofan diameter is significantly larger than that of the low pressure compressor 16, and the low pressure turbine 18 has a pressure ratio greater than five (5). The gear train 22 may be an epicycle gear train such as a planetary gear system or other gear system with a gear reduction ratio of greater than 2.5. It should be understood, however, that the above parameters are exemplary of only one geared turbofan engine and that the present invention is likewise applicable to other gas turbine engines including direct drive turbofans.

Airflow enters a fan nacelle 34, which may at least partially surrounds the core nacelle 12. The fan section 20 communicates airflow into the core nacelle 12 for compression by the low pressure compressor 16 and the high pressure compressor 26. Core airflow compressed by the low pressure compressor 16 and the high pressure compressor 26 is mixed with the fuel in the combustor 30 then expanded over the high pressure turbine 28 and low pressure turbine 18. The turbines 28, 18 are coupled for rotation with respective spools 24, 14 to rotationally drive the compressors 26, 16 and, through the gear train 22, the fan section 20 in response to the expansion. A core engine exhaust E exits the core nacelle 12 through a core nozzle 43 defined between the core nacelle 12 and a tail cone 32.

A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular bypass flow path 40 and may be discharged from the engine 10 through a fan variable area nozzle (FVAN) 42 which defines a variable fan nozzle exit area 44 between the fan nacelle 34 and the core nacelle 12 at an aft segment 34S of the fan nacelle 34 downstream of the fan section 20.

Figure 1B:
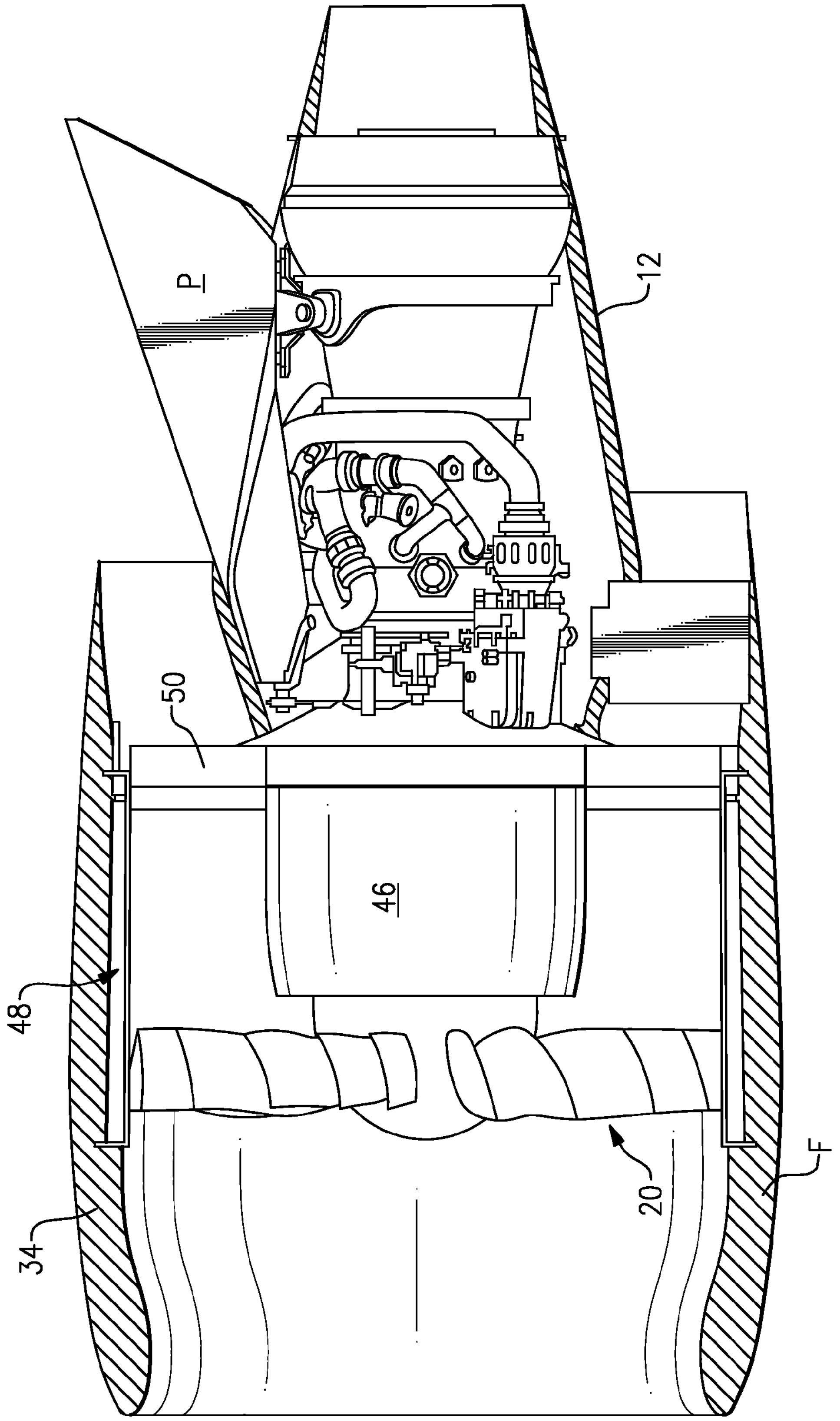
FIG. 1B is a perspective side partial fragmentary view of a FEGV system which provides a fan variable area nozzle.

Referring to FIG. 1B, the core nacelle 12 is generally supported upon a core engine case structure 46. A fan case structure 48 is defined about the core engine case structure 46 to support the fan nacelle 34. The core engine case structure 46 is secured to the fan case 48 through a multiple of circumferentially spaced radially extending fan exit guide vanes (FEGV) 50. The fan case structure 48, the core engine case structure 46, and the multiple of circumferentially spaced radially extending fan exit guide vanes 50 which extend therebetween is typically a complete unit often referred to as an intermediate case. It should be understood that the fan exit guide vanes 50 may be of various forms. The intermediate case structure in the disclosed embodiment includes a variable geometry fan exit guide vane (FEGV) system 36.

Thrust is a function of density, velocity, and area. One or more of these parameters can be manipulated to vary the amount and direction of thrust provided by the bypass flow B. A significant amount of thrust is provided by the bypass flow B due to the high bypass ratio. The fan section 20 of the engine 10 is nominally designed for a particular flight condition—typically cruise at 0.8M and 35,000 feet.

As the fan section 20 is efficiently designed at a particular fixed stagger angle for an efficient cruise condition, the FEGV system 36 and/or the FVAN 42 is operated to adjust fan bypass air flow such that the angle of attack or incidence of the fan blades is maintained close to the design incidence for efficient engine operation at other flight conditions, such as landing and takeoff. The FEGV system 36 and/or the FVAN 42 may be adjusted to selectively adjust the pressure ratio of the bypass flow B in response to a controller C. For example, increased mass flow during windmill or engine-out, and spoiling thrust at landing. Furthermore, the FEGV system 36 will facilitate and in some instances replace the FVAN 42, such as, for example, variable flow area is utilized to manage and optimize the fan operating lines which provides operability margin and allows the fan to be operated near peak efficiency which enables a low fan pressure-ratio and low fan tip speed design; and the variable area reduces noise by improving fan blade aerodynamics by varying blade incidence. The FEGV system 36 thereby provides optimized engine operation over a range of flight conditions with respect to performance and other operational parameters such as noise levels.

Figure 2A:
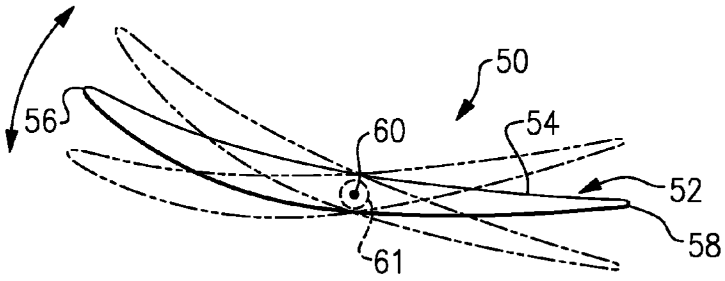
FIG. 2A is a sectional view of a single FEGV airfoil.

Referring to FIG. 2A, each fan exit guide vane 50 includes a respective airfoil portion 52 defined by an outer airfoil wall surface 54 between the leading edge 56 and a trailing edge 58. The outer airfoil wall 54 typically has a generally concave shaped portion forming a pressure side and a generally convex shaped portion forming a suction side. It should be understood that respective airfoil portion 52 defined by the outer airfoil wall surface 54 may be generally equivalent or separately tailored to optimize flow characteristics.

Figure 2B:
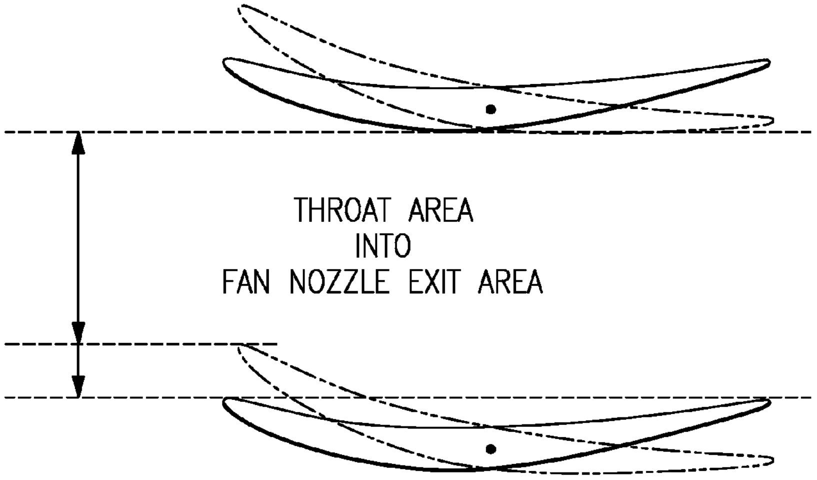
FIG. 2B is a sectional view of the FEGV illustrated in FIG. 2A shown in a first position.

Each fan exit guide vane 50 is mounted about a vane longitudinal axis of rotation 60. The vane axis of rotation 60 is typically transverse to the engine axis A, or at an angle to engine axis A. It should be understood that various support struts 61 or other such members may be located through the airfoil portion 52 to provide fixed support structure between the core engine case structure 46 and the fan case structure 48. The axis of rotation 60 may be located about the geometric center of gravity (CG) of the airfoil cross section. An actuator system 62 (illustrated schematically; FIG. 1A), for example only, a unison ring operates to rotate each fan exit guide vane 50 to selectively vary the fan nozzle throat area (FIG. 2B). The unison ring may be located, for example, in the intermediate case structure such as within either or both of the core engine case structure 46 or the fan case 48 (FIG. 1A).

Figure 2C:
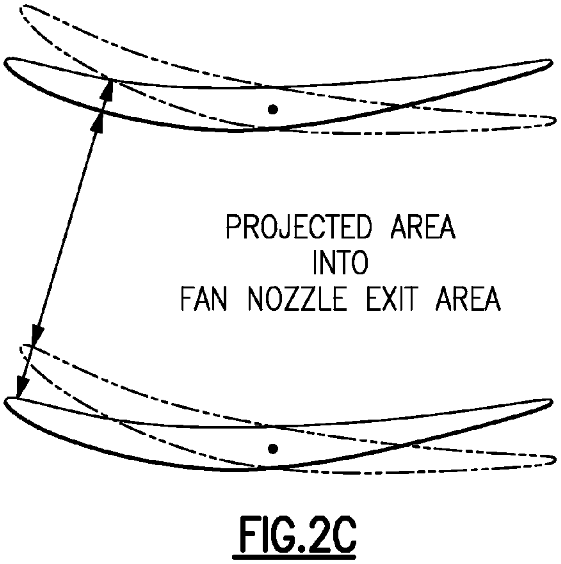
FIG. 2C is a sectional view of the FEGV illustrated in FIG. 2A shown in a rotated position.

In operation, the FEGV system 36 communicates with the controller C to rotate the fan exit guide vanes 50 and effectively vary the fan nozzle exit area 44. Other control systems including an engine controller or an aircraft flight control system may also be usable with the present invention. Rotation of the fan exit guide vanes 50 between a nominal position and a rotated position selectively changes the fan bypass flow path 40. That is, both the throat area (FIG. 2B) and the projected area (FIG. 2C) into the variable fan nozzle exit area 44 are varied through adjustment of the fan exit guide vanes 50. By adjusting the fan exit guide vanes 50 (FIG. 2C), bypass flow B into the variable fan nozzle exit area 44 is increased for particular flight conditions such as during an engine-out condition. Since less bypass flow will spill around the outside of the fan nacelle 34, the maximum diameter of the fan nacelle required to avoid flow separation may be decreased. This will thereby decrease fan nacelle drag during normal cruise conditions and reduce weight of the nacelle assembly. Conversely, by closing the FEGV system 36 to decrease flow area relative to a given bypass flow B, into the variable fan nozzle exit area engine thrust is significantly spoiled to thereby minimize or eliminate thrust reverser requirements and further decrease weight and packaging requirements. It should be understood that other arrangements as well as essentially infinite intermediate positions are likewise usable with the present invention.

By adjusting the FEGV system 36 in which all the fan exit guide vanes 50 are moved simultaneously, engine thrust and fuel economy are maximized during each flight regime. By separately adjusting only particular fan exit guide vanes 50 to provide an asymmetrical fan bypass flow path 40, engine bypass flow may be selectively vectored to provide, for example only, trim balance, thrust controlled maneuvering, enhanced ground operations and short field performance.

Figure 3A:
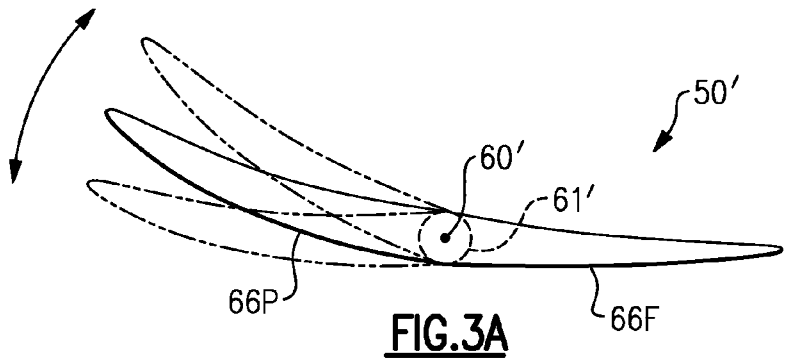
FIG. 3A is a sectional view of another embodiment of a single FEGV airfoil.
Figure 3B:
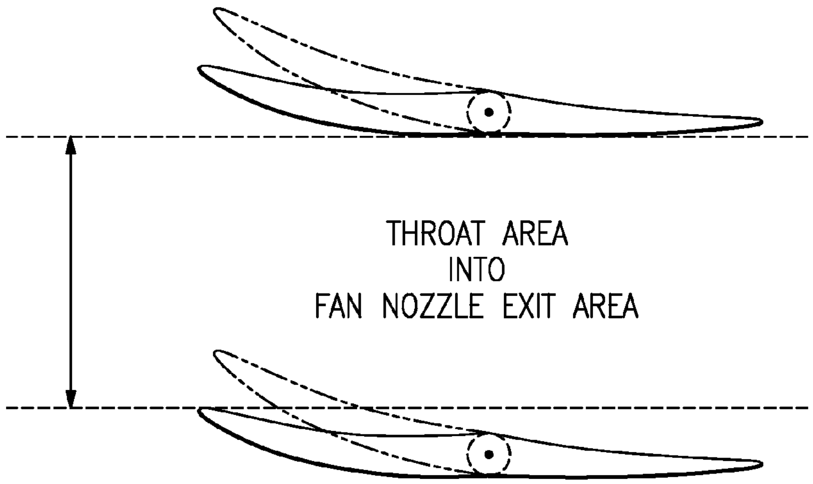
FIG. 3B is a sectional view of the FEGV illustrated in FIG. 3A shown in a first position.
Figure 3C:
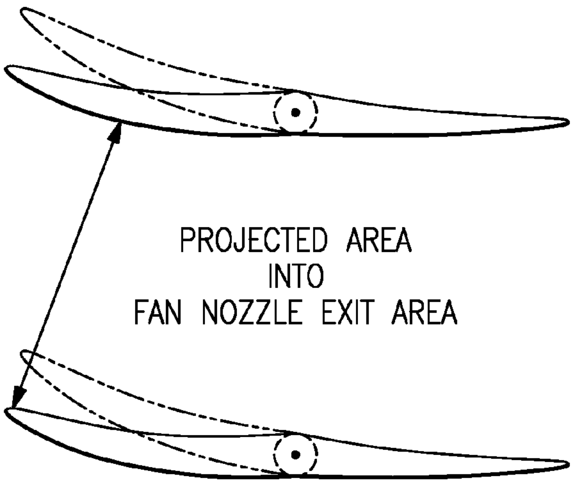
FIG. 3C is a sectional view of the FEGV illustrated in FIG. 3A shown in a rotated position.

Referring to FIG. 3A, another embodiment of the FEGV system 36' includes a multiple of fan exit guide vane 50' which each includes a fixed airfoil portion 66F and pivoting airfoil portion 66P which pivots relative to the fixed airfoil portion 66F. The pivoting airfoil portion 66P may include a leading edge flap which is actuatable by an actuator system 62' as described above to vary both the throat area (FIG. 3B) and the projected area (FIG. 3C) into the variable fan nozzle exit area 44.

Figure 4A:
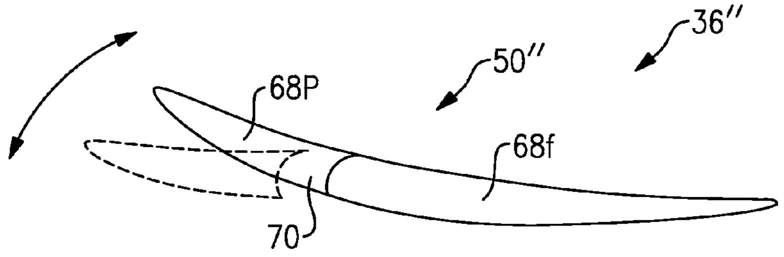
Figure 4B:
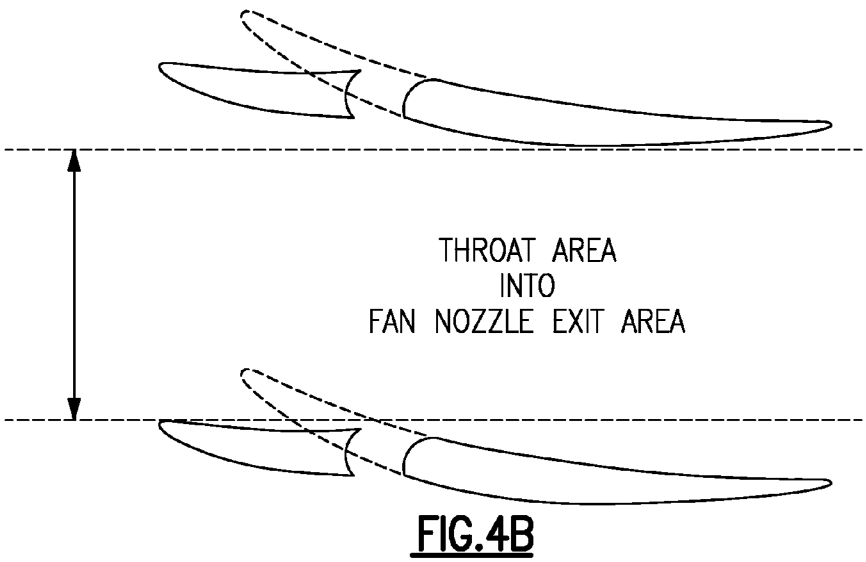
FIG. 4B is a sectional view of the FEGV illustrated in FIG. 4A shown in a first position.
Figure 4C:
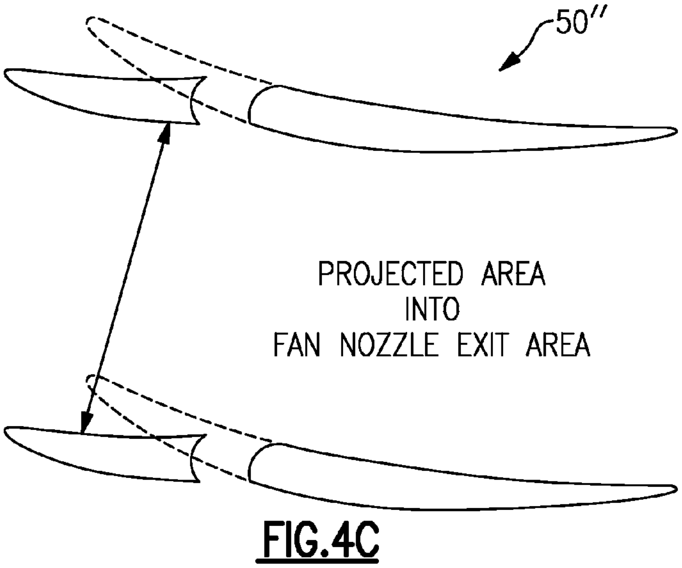
FIG. 4C is a sectional view of the FEGV illustrated in FIG. 4A shown in a rotated position.

Referring to FIG. 4A, another embodiment of the FEGV system 36" includes a multiple of slotted fan exit guide vane 50" which each includes a fixed airfoil portion 68F and pivoting and sliding airfoil portion 68P which pivots and slides relative to the fixed airfoil portion 68F to create a slot 70 vary both the throat area (FIG. 4B) and the projected area (FIG. 4C) into the variable fan nozzle exit area 44 as generally described above. This slatted vane method not only increases the flow area but also provides the additional benefit that when there is a negative incidence on the fan exit guide vane 50" allows air flow from the high-pressure, convex side of the fan exit guide vane 50" to the lower-pressure, concave side of the fan exit guide vane 50" which delays flow separation.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fan section of a gas turbine engine comprising:

a multiple of fan exit guide vanes, arranged about a central longitudinal axis, defining a throat area leading to a fan nozzle exit area, at least one of said multiple of fan exit guide vanes movable to change the throat area, wherein each of said multiple of fan exit guide vanes include a pivotable portion and a fixed portion, said pivotable portion rotatable about an axis of rotation relative to said fixed portion, said axis of rotation transverse to the central longitudinal axis or at an angle to the central longitudinal axis.

2. The fan section as recited in claim 1, wherein said at least one of said multiple of fan exit guide vanes are rotatable to change said fan nozzle exit area.

3. The fan section as recited in claim 1, wherein said multiple of fan exit guide vanes are mounted within an intermediate engine case structure.

4. The fan section as recited in claim 3, wherein a unison ring operates to rotate each of the multiple of fan exit guide vanes.

5. The fan section as recited in claim 4, wherein the unison ring is located in the intermediate case structure.

6. The fan section as recited in claim 1, wherein said pivotable portion includes a leading edge flap.

7. The fan section as recited in claim 1, wherein each of said multiple of fan exit guide vanes are movable to change said throat area leading to said fan nozzle exit area.

8. The fan section as recited in claim 1, wherein each of said multiple of fan exit guide vanes are rotatable to change said fan nozzle exit area.

9. The fan section as recited in claim 1 , wherein each said pivotable portion slides relative to the fixed portion, forming a slot between the pivotable portion and the fixed portion.

10. The fan section as recited in claim 9, wherein the axis of rotation is located about the geometric center of gravity of each of the fan exit guide vane cross section.

11. The fan section as recited in claim 1, wherein the multiple of fan exit guide vanes communicates with a controller to move the fan exit guide vanes and change the fan nozzle exit area by changing the throat area.

12. A gas turbine engine comprising:

a core section defined about an engine axis;

a fan section mounted at least partially around said core section to define a fan bypass flow path; and a multiple of fan exit guide vanes in communication with said fan bypass flow path to define a throat area leading to a fan nozzle exit area, at least one of said multiple of fan exit guide vanes movable to change the throat area, wherein said at least one of said multiple of fan exit guide vanes includes a pivotable portion and a fixed portion, said pivotable portion rotatable about an axis of rotation relative to said fixed portion, said axis of rotation transverse to the engine axis or at an angle to the engine axis.

13. The engine as recited in claim 12, wherein said at least one of said multiple of fan exit guide vanes is rotatable about an axis transverse to said engine axis.

14. The engine as recited in claim 12, wherein all of said multiple of fan exit guide vanes are rotatable.

15. The engine as recited in claim 12, wherein said multiple of fan exit guide vanes are mounted within an intermediate engine case structure.

16. The engine as recited in claim 12, wherein said pivotable portion includes a leading edge flap.

17. The engine as recited in claim 12, wherein said core section includes a core nacelle supported by a core case structure.

18. The engine as recited in claim 12, wherein said fan section includes a fin nacelle supported by a fan case structure.

19. The engine as recited in claim 12, wherein the multiple of fan exit guide vanes communicates with a controller, said multiple of fan exit guide vanes selectively adjusted to adjst a pressure ratio of the bypass flow path in response to the controller.

20. The engine as recited in claim 12, wherein said at least one of said multiple of fan exit guide vanes is rotatable about an axis at an angle to said engine axis.

21. A method of changing a fan nozzle exit area of a gas turbine engine comprising the steps of:

(A) selectively moving at least one of a multiple of fan exit guide vanes to change a throat area leading to a fan nozzle exit area in response to a flight condition, wherein at least one of said multiple of fan exit guide vanes includes a pivotable portion and a fixed portion, said pivotable portion movable about an axis of rotation relative to said fixed portion, said axis of rotation transverse to an engine axis or at an angle to the engine axis.

22. The method as recited in claim 21, wherein said step (A) further comprises:

(a) at least partially moving at least one of the multiple of fan exit guide vanes to increase the fan nozzle exit area in response to a non-cruise flight condition.

23. The method as recited in claim 21, wherein said step (A) further comprises:

(a) at least partially moving at least one of the multiple of fan exit guide vanes to at least partially block the bypass flow path with the at least one of the multiple of fan exit guide vanes to provide an asymmetrical fan nozzle exit area.

24. The method as recited in claim 23, wherein said step (A) further comprises:

(a) at least partially blocking the bypass flow path with the at least one of the multiple of fan exit guide vanes to at least partially spoil the bypass flow through the bypass flow path.

25. A fan section of a gas turbine engine comprising:

a multiple of fan exit guide vanes, arranged about a central longitudinal axis, defining a throat area leading to a fan nozzle exit area, at least one of said multiple of fan exit guide vanes movable to change the throat area, wherein each of said multiple of fan exit guide vanes includes a pivotable portion and a fixed portion, said pivotable portion movable about an axis of rotation relative to said fixed portion, said axis of rotation transverse to the central longitudinal axis or at angle to the central longitudinal axis.

26. The fan section as recited in claim 25, wherein each of said multiple of fan exit guide vanes define a slotted vane arrangement.

* * * * *

UNITED STATES PATENT AND TRADEMARK OFFICE

CERTIFICATE OF CORRECTION

PATENT NO. : 8,347,633 B2
APPLICATION NO. : 11/829213
DATED : January 8, 2013
INVENTOR(S) : Smith et al.

It is certified that error appears in the above-identified patent and that said Letters Patent is hereby corrected as shown below:

IN THE CLAIMS:

Claim 6, Column 6, line 12: “fin” should be replaced with “fan”

Signed and Sealed this
Second Day of April, 2013

Teresa Stanek Rea
*Acting Director of the United States Patent and Trademark Office*